United States Patent
Lyon (10) Patent No.: US 10,719,292 B2
(45) Date of Patent: Jul. 21, 2020

(54) SOUND ENHANCEMENT ADAPTER

(71) Applicant: Google LLC, Mountain View, CA (US)

(72) Inventor: Richard Lyon, Los Altos, CA (US)

(73) Assignee: Google LLC, Mountain View, CA (US)

(*) Notice: Subject to any disclaimer, the term of this patent is extended or adjusted under 35 U.S.C. 154(b) by 12 days.

(21) Appl. No.: 15/977,273

(22) Filed: May 11, 2018

(65) Prior Publication Data
US 2019/0347062 A1 Nov. 14, 2019

(51) Int. Cl.
| | | |
|---|---|---|
| G06F 3/16 | (2006.01) | |
| H04R 1/40 | (2006.01) | |
| H04R 29/00 | (2006.01) | |
| H04R 5/027 | (2006.01) | |

(52) U.S. Cl.
CPC .............. *G06F 3/165* (2013.01); *G06F 3/162* (2013.01); *H04R 1/406* (2013.01); *H04R 5/027* (2013.01); *H04R 29/00* (2013.01); *H04R 2420/09* (2013.01); *H04R 2499/11* (2013.01)

(58) Field of Classification Search
CPC ......... G06F 3/162; G06F 3/165; H04R 1/406; H04R 5/027; H04R 29/00; H04R 2420/09; H04R 2499/11
USPC .......................................................... 700/94
See application file for complete search history.

(56) References Cited

U.S. PATENT DOCUMENTS

| | | | |
|---|---|---|---|
| 6,044,164 A * | 3/2000 | Ach-Kowalewski | H04R 25/505 381/312 |
| 9,344,793 B2 * | 5/2016 | Selig | H04R 1/1091 |
| 9,992,585 B1 * | 6/2018 | Recker | H04R 25/407 |
| 2011/0216928 A1 * | 9/2011 | Eisenberg | H04R 25/00 381/315 |
| 2012/0057078 A1 * | 3/2012 | Fincham | H04N 5/57 348/645 |
| 2013/0266154 A1 * | 10/2013 | McCormack | H04R 3/00 381/117 |
| 2015/0098580 A1 * | 4/2015 | Halevi | H04R 1/06 381/74 |
| 2017/0111724 A1 * | 4/2017 | Toner | H04R 1/1033 |
| 2017/0142534 A1 * | 5/2017 | Kasha | G06F 3/162 |
| 2017/0289688 A1 * | 10/2017 | McIver, Jr. | G06F 3/165 |

* cited by examiner

*Primary Examiner* — Hemant S Patel
(74) *Attorney, Agent, or Firm* — McDonnell Boehnen Hulburt & Berghoff LLP (57) ABSTRACT

Disclosed herein are systems and methods for a sound enhancement system coupled to a mobile device. In one aspect, the present disclosure includes the system having first bidirectional communication link configured to receive an audio signal, transmit an audio signal, and receive configuration parameters. The system also includes a memory configured to store the configuration parameters. Additionally, the system has an audio input configured to receive ambient audio. Yet further, the is configured to operate in one of two operation modes. In the first mode, the system is configured to receive an audio signal from the bidirectional communication link and output an audio signal based on the received audio signal by way of the audio output pathway, and in the second mode, the system is configured to process the ambient audio signal by the audio processor based on stored configuration parameters and create an output audio signal.

18 Claims, 6 Drawing Sheets

SOUND ENHANCEMENT ADAPTER

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of devices are increasingly prevalent in numerous aspects of modern life. These devices have become popular media consumption devices in recent years. People use portable audio players, mobile phones, and other electronic devices for listening to music and watching video content. In some cases, a user may connect headphones to his or her device to listen to audio.

In many instances, manufacturers of mobile devices are omitting the headphone plug on mobile devices. Thus, it may be desirable for a user to have an adapter that provides a headphone plug interface to the mobile device. Additionally, in other instances, a user may desire higher quality audio than the mobile devices may naturally provide. In these instances, a user may connect an audio amplifier and/or a digital audio converter (DAC) to a device to create higher audio quality.

Additionally, people with hearing impairments may benefit from having a device that assists their ability to hear. Commonly, people with hearing loss may wear hearing aids. However, in some instances, it may be uncomfortable to wear a hearing aid while using headphones. Moreover, in some situations, such as those with significant ambient noise, a person without a hearing impairment may also have trouble hearing and may benefit from assisted listening.

SUMMARY

Certain audio devices may be implemented as having a dual mode of operation, in which the device may operate in the first mode, the second mode, or both modes simultaneously. In the first mode, the device may operate to provide audio signals as playback from an audio device. For example, the first mode may include listening to audio from a mobile device. In the second mode, the device may operate to provide assisted listening of ambient audio signals. For example, the second mode may aid a user in listening to conversations. When operating in both modes simultaneously, the device may operate to provide audio signals as playback from an audio device while also providing assisted listening of ambient audio signals.

In one aspect, the present disclosure includes a sound enhancement system having a first bidirectional communication link. The first bidirectional communication link is configured to receive an audio signal from a mobile device, transmit an audio signal to the mobile device, and receive configuration parameters from the mobile device. The sound enhancement system also includes a memory configured to store the configuration parameters. Additionally, the sound enhancement system has an audio input configured to receive ambient audio and provide a representation of an ambient audio signal. The sound enhancement system further includes an audio processor. Yet further, the sound enhancement system includes an audio output pathway. Yet further, the sound enhancement system is configured to selectively operate in one of two operation modes. In the first mode, the sound enhancement system is configured to receive an audio signal from the bidirectional communication link and output an audio signal based on the received audio signal by way of the audio output pathway, and in the second mode, the sound enhancement system is configured to process the ambient audio signal by the audio processor based on stored configuration parameters and create an output audio signal, wherein the output audio signal is communicated by way of the audio output pathway.

In another aspect, the present disclosure includes a method of operating an audio component. The method includes selectively operating in one of two operation modes. In the first mode, the method includes receiving an audio signal from a bidirectional communication link and outputting an audio signal based on the received audio signal by way of an audio output pathway. In the second mode, the method includes receiving an ambient audio signal, processing the ambient audio signal by a processor based on stored configuration parameters, and creating an output audio signal based on the processed ambient audio signal, wherein the output audio signal is communicated by way of the audio output pathway.

In another aspect, the present disclosure includes non-transitory computer-readable medium configured to store instructions that when executed by a computing system comprising one or more processors, causes the computing system to perform operations. The operations include selectively operating in one of two modes. In the first mode, the operations include establishing the bidirectional communication link, where the bidirectional communication link includes establishing an audio-class device interface and establishing a mass-storage-class device interface, receiving an audio signal from the audio-class device interface, and outputting an audio signal based on the received audio signal by way of an audio output pathway. In the second mode, the operations include receiving an ambient audio signal by way of one of (i) a stereo pair of microphones and (ii) an input configured to be coupled to at least one microphone, processing the ambient audio signal by a processor based on stored configuration parameters, and creating an output audio signal based on the processed ambient audio signal, where the output audio signal is communicated by way of the audio output pathway.

DETAILED DESCRIPTION

1. Overview

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

The following detailed description describes various features and functions of the disclosed apparatuses, systems, and methods with reference to the accompanying figures. In the figures, similar symbols typically identify similar components, unless context or description dictates otherwise. The illustrative apparatuses, systems, and methods embodiments described herein are not meant to be limiting. Certain aspects of the disclosed systems and methods can be arranged and combined in a wide variety of different configurations, all of which are contemplated herein.

Disclosed herein are systems and methods that present a sound enhancement device for use with a mobile device. The sound enhancement device may be an external adapter that can serve to connect headphones to a mobile device. The sound enhancing device may provide hearing-aid like processing for various audio sources that a user may listen to. The sound enhancement device may be able to receive audio from the mobile device and create an audio output through the headphones of the user. The sound enhancement device may also be able to function as a listening assist device for the user. In the listening assist mode, the sound enhancement device may function as a low-latency amplifier for ambient audio signals. For example, the sound enhancement device may be able to receive audio of the environment of the user and correspondingly output an enhanced version of the ambient audio.

In some examples, the sound enhancing device may function to enhance speech that is present in the environment of the user. Additionally, the sound enhancement device may perform both functions at once. For example, a user may be listening to audio from his or her mobile device, but also wishes to be able to hear conversations going on around. Thus, the sound enhancement device can provide both audio from the mobile device and audio from the local environment to the user.

The sound enhancing device may provide sound enhancement functionality similar to that provided by a traditional hearing aid, but not necessarily only for those with hearing deficiencies. For example, when a person without hearing loss is in a noisy environment, the noise may manifest itself in a similar manner as to what a person with hearing loss experiences. Thus, providing some audio adjustments to enhance sounds corresponding to dialog and/or a conversation may be desirable.

The sound enhancing device may include sound processing functionality that a user may control. In some examples, a user may perform some operations with his or her mobile device to establish parameters for the enhancement system. In one example, a mobile application may play several sounds to a user and the user may provide various responses to establish the processing parameters. For example, the processing parameters may be selected to offset a user's hearing disability or the parameters may be selected to create an audio profile desirable to the user.

In some examples, the sound enhancing device may operate with one set of parameters for audio input from a mobile device and second set of parameters for audio input from microphones. However, in other examples, the sound enhancing device may use the same (or similar) profiles for both audio sources. Thus, the sound enhancing device may provide user-customizable audio outputs.

In a third operation mode, the sound enhancement device can provide ambient audio signals back to the mobile device. For example, the user may be listening to music via his or her mobile device and the mobile device may receive a phone call. The user may be able to answer the phone call and hear the caller through his headphones and talk back to the caller via a microphone of the sound enhancement device.

Figure 1A:
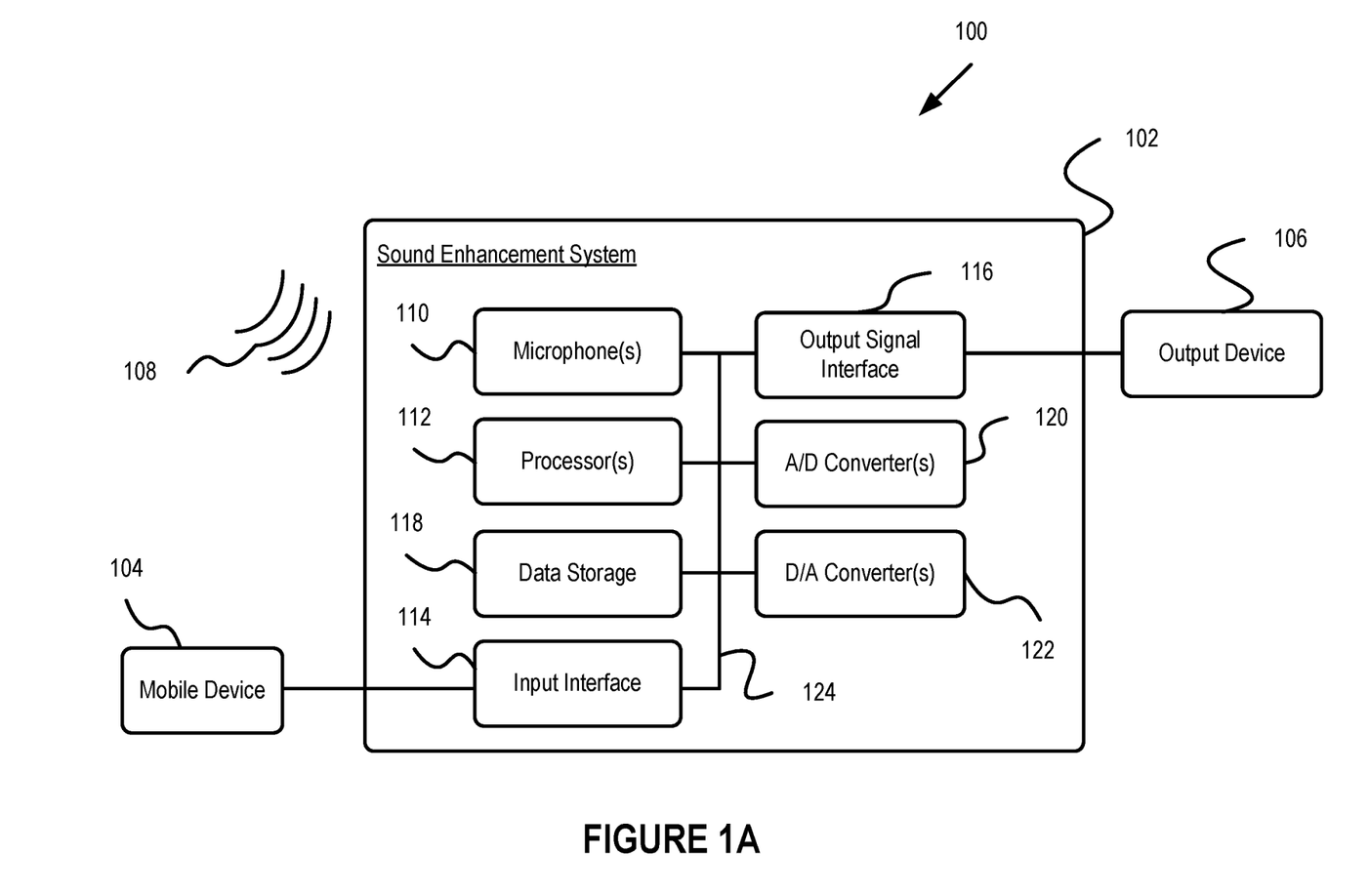
FIG. 1A is a simplified block diagram of an example a sound enhancement device.

FIG. 1A shows one example of a sound enhancement system 100 configured according to some embodiments of the disclosed systems and methods. The sound enhancement system 100 may be a device configured to couple a mobile device 104 to an output device 106. The sound enhancement system 100 may have an bidirectional link 114 that is communicably coupled to a mobile device 104. In some examples, the bidirectional link 114 may also include a wireless interface, such as BLUETOOTH, or another wireless protocol. The bidirectional link may be able to communicate audio to and from the mobile device 104 and data to and from the mobile device 104 by way of the wireless interface as well. The sound enhancement system 100 may also include a battery (not shown) used to power the sound enhancement system 100.

The bidirectional link 114 may be a USB connection. The mobile device 104 may function as the USB host device and the sound enhancement system 100 may be a peripheral device. When the sound enhancement system 100 is coupled to the mobile device 104 by way of the bidirectional link 114, the sound enhancement system 100 may appear as three interfaces to the mobile device 104. The three interfaces may be an audio input, an audio output, and a USB-mass storage device. The audio input may function to provide audio from the sound enhancement system 100 to the mobile device 104. The audio output may provide audio from the mobile device 104 to the sound enhancement system 100. The USB-mass storage interface may act like a memory to store files on the sound enhancement system 100 provided by the mobile device 104. Additionally, the mobile device 104 may also provide electrical power to the sound enhancement system 100 by way of the bidirectional link 114. The power provided may be used to operate the sound enhancement system 100, and also charge a battery of the sound enhancement system 100. In some examples, the sound enhancement system 100 may be used without the mobile device 104. When the sound enhancement system 100 is not coupled to the mobile device 104, it may be powered by the battery and function as an assisted-listening device.

During operation of the sound enhancement system 100, one or more microphones 110 of the sound enhancement system may capture audio. This captured audio may be provided to the mobile device 104 by way of the bidirectional link 114. For example, if the mobile device 104 is a mobile phone, audio from the one or more microphones 110 may be a user's voice for a phone call. In other examples, the audio from the one or more microphones 110 may be a user's voice for an audio command. In yet other examples, the audio from the one or more microphones 110 may contain ambient audio of a user's environment.

The audio output interface may be used when a user wants to listen to audio from his or her mobile device 104. For example, the user may listen to audio, watch a movie, or be in a phone call on his or her mobile device 104. The mobile device may output an audio signal in either an analog or a digital format to the bidirectional link 114 of the sound enhancement system 100. The sound enhancement system may be able to create an output audio signal to output through the output signal interface 116 to the output device 106. In some examples, the output device may be headphones, earbuds, bone-conduction earpieces, etc. Additionally, the output signal interface 116 may include audio amplifier to provide the output audio at a sufficient level for the output device 106. Generally, the output signal interface 116 will provide an analog audio signal to the output device 106. However, in some examples, the output signal interface may provide a digital audio signal to the output device 106. The output device 106 may responsively convert the digital audio signal to analog before the user may hear the output audio.

The USB-mass storage interface of the bidirectional link 114 allows the mobile device 104 to store files in the data storage 118 of the sound enhancement system 100. In some examples, discussed further with respect to FIG. 2, the files stored to the data storage 118 may include various configuration parameters for the sound enhancement system 100. For example, a user may specify audio preferences that may be stored to the data storage. The audio parameters may include operation modes, frequency equalization information, and other audio parameters. The processor(s) 112 of the sound enhancement system 100 may use these stored audio parameters to control the operation of the sound enhancement system.

During the operation of the sound enhancement system 100, one or more microphones 110 may be configured to capture ambient audio 108 of the environment of the user of the sound enhancement system 100. As shown in FIG. 1A, the one or more microphones 110 may be located within the sound enhancement system 100.

Figure 1B:
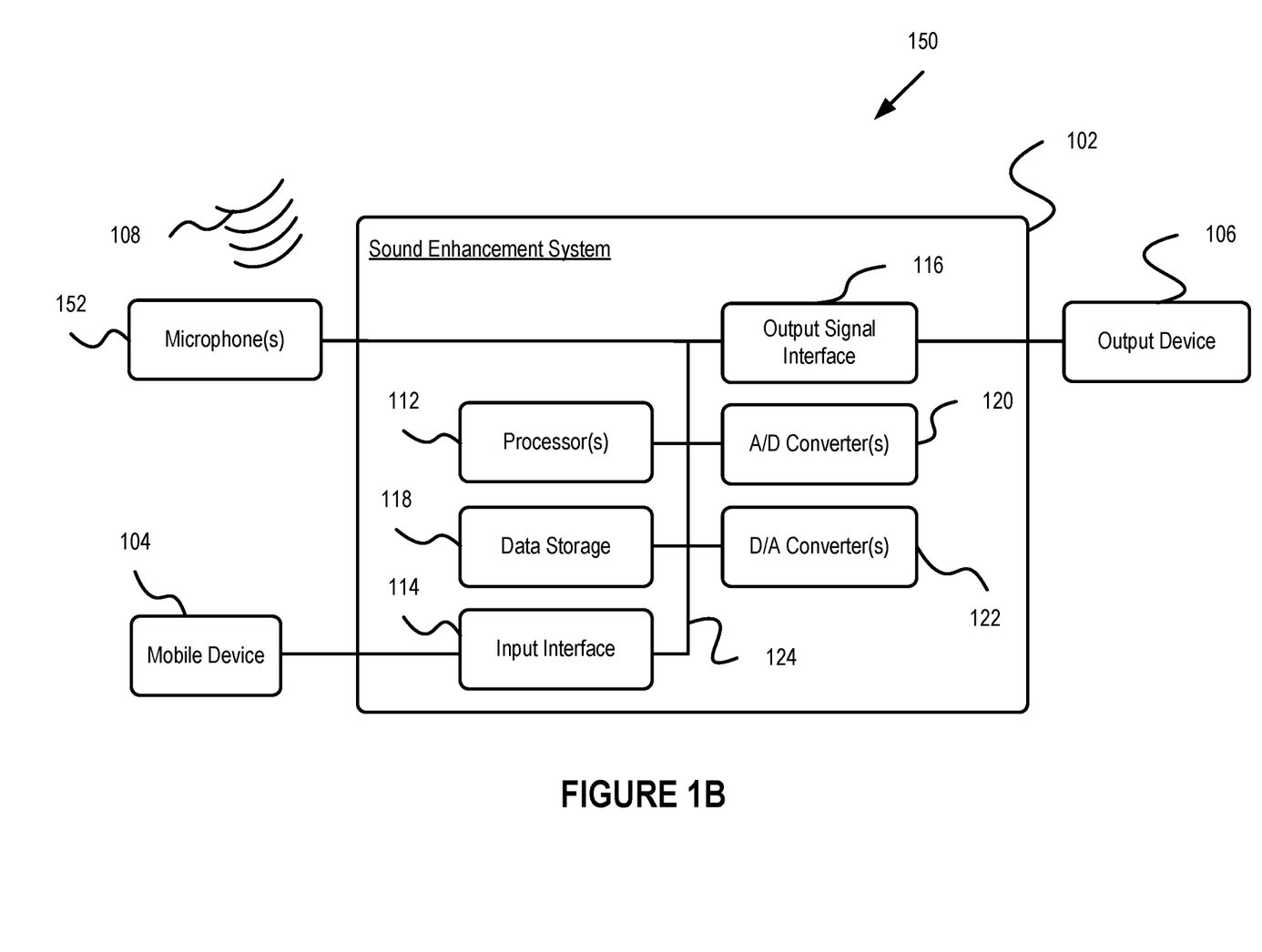
FIG. 1B is a simplified block diagram of an example a sound enhancement device.

In an alternative embodiment, shown in FIG. 1B, the sound enhancement system 150 may include one or more microphones 152 that are external to the sound enhancement system 150. In examples where the one or more microphones 152 are located outside sound enhancement system 150, the one or more microphones 152 may couple to the sound enhancement system 150 and provide the ambient audio signals to the sound enhancement system 150. Other than the location of the one or more microphones 152, the sound enhancement system 150 may function in a similar manner to sound enhancement system 100. Therefore, the description of sound enhancement system 100 is equally applicable to sound enhancement system 150. Similarly, the one or more microphones 150 may be functionally similar to the one or more microphones 152 (other than location). Thus, the description of one or more microphones 150 is equally applicable to the one or more microphones 152.

The one or more microphones 110 may be configured as a single microphone or multiple microphones. The one or more microphones 110 may be configured to capture audio of the environment as a single channel, such as mono audio. In other examples, the one or more microphones 110 may be configured to capture audio of the environment as multiple channels, such as stereo audio. In examples where the one or more microphones 110 capture more than one channel of audio, the one or more microphones 110 may capture audio where each audio stream corresponds to one microphone.

The one or more microphones 110 may be configured to have an omnidirectional pattern or a directional pattern (i.e., the direction from which the one or more microphones 110 receive audio best). In some examples, the one or more microphones 110 may include multiple microphones, where different microphones have different patterns. In one example, the one or more microphones 110 may include both microphones having omnidirectional patterns and directional patterns. The source of input audio from the one or more microphones 110 may be chosen by the processor(s) 112 based on which microphones are providing a better quality source of audio. In some examples, the one or more microphones 110 may be actively switched by the processor(s) 112 based on the change in audio provided by the one or more microphones 110 or based on switching of an operating mode of the sound enhancement system 100.

In another example, the one or more microphones 110 may be configured to perform beam steering. In a beam steering application, the one or more microphones 110 may be configured to direct an audio beam for receiving signals in a given direction. A user may specify a given direction on his or her mobile device 104 and the mobile device may store parameters of the given direction in the data storage 118. The processor(s) 112 may control the beam of the one or more microphones 110 in order to receive audio in the desired direction. In another example, the processor(s) 112 may be able to steer the beam based on the received ambient audio 108. For example, if the processor(s) 112 detect a desired voice or another desired audio source in a given direction, then the processor(s) 112 may steer the beam in the direction of the desired audio source. Additionally, if the processor(s) 112 detect an undesired voice or another undesired audio source in a given direction, then the processor(s) 112 may steer the beam away from the direction of the desired audio source. In yet another embodiment, the processor(s) 112 may use time-delay information between two different microphones in order to separate different audio sources.

When signals are received as analog audio (from either the one or more microphones 110 or from the mobile device 104 by way of the bidirectional link 114), the analog audio signals may be digitized by the analog to digital converter(s) 120. The analog to digital converter(s) 120 function to create a digital representation of the analog audio inputs. Once the audio signals are digitized, they may be more easily processed by the processor(s) 120.

The sound enhancement system 100 may include one or more processor(s) 112 as well. The processor(s) 120 may perform many different functions for the sound enhancement system 100. The processor(s) 120 may control the operation mode of the sound enhancement system 100. The processor(s) 120 may also process audio signals from the microphone(s) 110 and/or the mobile device 104.

The processor(s) 102 may include an audio processor. The audio processor may be configured to process audio based on finite impulse response (FIR) filters. In some examples, the functionality of the audio processor may be controlled by changing the filter coefficients (i.e., parameters) of the filter.

In some examples, the sound enhancement system 100 may also include a communication interface (not shown) that enables the sound enhancement system 100 to communicate with the internet. In some examples, some of the processing may be performed by an internet-based (e.g., cloud) sound processing service. Although cloud-based processing may include more latency than local processing, it may be useful in some situations, such as identifying an operating mode. Throughout the present disclosure, it is contemplated that the processing may either be local or internet-based processing.

The processor(s) 120 may control the operation mode based on a switch. The switch may be a physical switch of the sound enhancement system 100 or a software switch. A software switch may be controlled by a user by way of the mobile device 104, a toggle on the sound enhancement system 100, by an audio command from the user, based on ambient audio 108, or by other means.

In a first operation mode, the sound enhancement system 100 may function to provide audio from the mobile device 104 to an output device 106 for output to the user. In this operation mode, the mobile device 104 may provide an analog or digital audio signal to the sound enhancement device by way of the bidirectional link 114. In some examples, when analog audio signals are provided, as previously discussed, an analog to digital converter, such as one of the analog to digital converter(s) 120 may digitize the audio signal for processing. In other examples, a digital audio signal may be provided from the mobile device to the bidirectional link 114. The processor(s) 120 may process the digital audio signal from the bidirectional link 114 or from the analog to digital converter(s) 120. The processor(s) 120 may process the signal based on parameters stored in the data storage 118. The processing may include frequency enhancement and/or equalization, noise reduction, etc. After processing, the digital audio signal may be converted back into an analog audio signal by the digital to analog converter(s) 122. The analog audio signals may be amplified and/or output by the output signal interface 116 to the output device 106.

In the second operating mode, the sound enhancement system 100 may function to provide audio from the one or more microphone(s) 110 to an output device 106 for output to the user. This mode may be an assisted listening mode to help a user hear ambient audio 108 of his or her environment though the output device 106. In this operation mode, the one or more microphone(s) may provide an analog audio signal to the sound enhancement device based on the ambient audio 108. As previously discussed, an analog to digital converter, such as one of the analog to digital converter(s) 120 may digitize the audio signal for processing. The processor(s) 120 may process the digital audio signal from the from the analog to digital converter(s) 120 representative of the ambient audio signal. The processor(s) 120 may process the signal based on parameters stored in the data storage 118. The processing may include frequency enhancement and/or equalization, noise reduction, etc. After processing, the digital audio signal may be converted back into an analog audio signal by the digital to analog converter(s) 122. The analog audio signals may be amplified and/or output by the output signal interface 116 to the output device 106.

Additionally, the processor(s) 112 may function in a hybrid of the two modes. In the hybrid mode, both audio from the mobile device 104 and ambient audio signals may be provided to the user through the output device 106. In the hybrid mode, the processor(s) may be able to allow a user to both listen to audio from his or her mobile device and also hear ambient audio 108.

For example, if a user is listening to music from his or her mobile device 104, he or she may still want to be aware of ambient audio 108, such as if another person begins speaking to him or her. In this example, the processor(s) may provide a processed version of the audio from the mobile device 104 (such as with a desired music equalization) and processed version of the ambient audio 108 (such as with voice enhancement), to the user through the output device 106. In this example, a user can still be part of a conversation while listening to his or her audio from the mobile device. Yet further, the processor(s) 112 may also be able to identify several sources of ambient audio 108 in an environment. The processor(s) 112 may be able to separate different sources of audio based on the audio content and only provide the relevant audio to the user. Other examples are possible as well.

Figure 2:
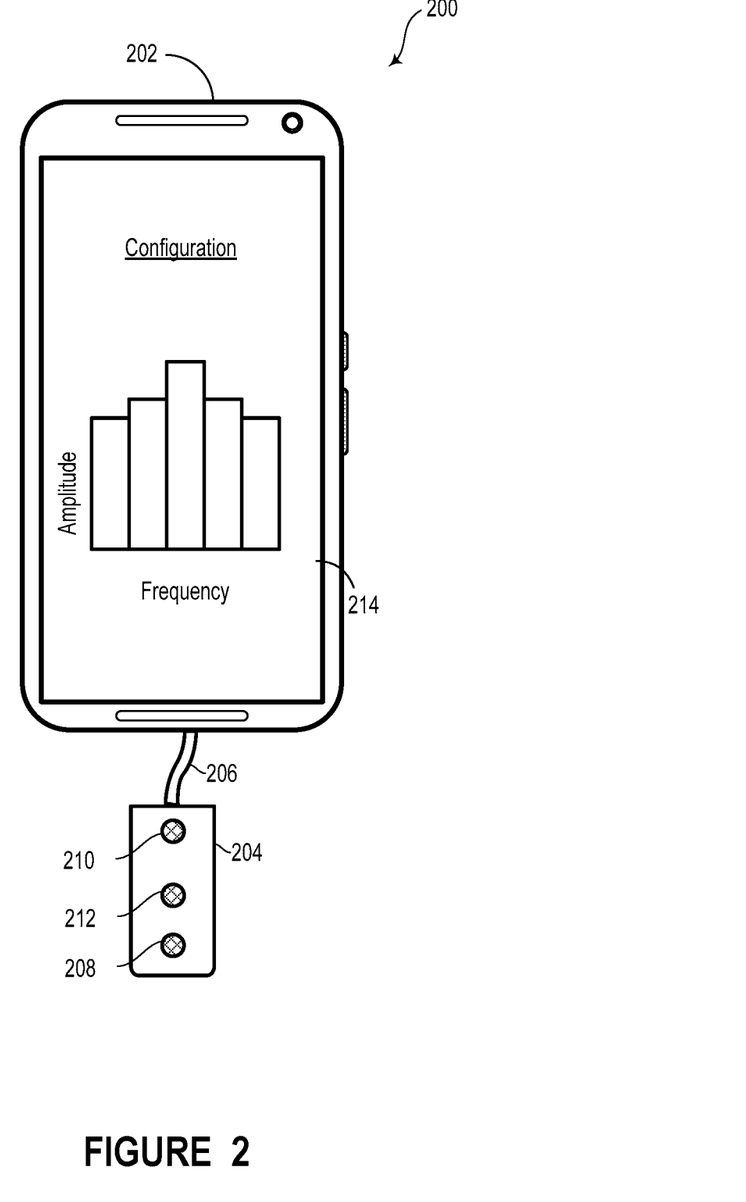
FIG. 2 illustrates an example configuration of sound enhancement device, according to an example implementation.

FIG. 2 illustrates an example configuration 200 of a sound enhancement device 204 receiving configuration parameters from a mobile device 202. In the configuration 200, a user may be able to set up the parameters for use by the various operation modes of the sound enhancement device 204. The sound enhancement device 204 may be coupled to the mobile device 202 by way of a wired connection 206, such as a USB connection. When connected, the sound enhancement device 204 may appear as a USB audio input class interface, a USB audio output class interface, and a USB mass storage mode interface. Additionally, the sound enhancement device 204 includes an output interface 208 that goes to an audio output device, such as headphones. Yet further, the sound enhancement device 204 may include one or more audio inputs 210 and a switch 212. The one or more audio inputs 210 and the switch 212 may function in a similar manner to those described with respect to FIG. 1A. In some examples, the one or more audio inputs 210 may be a microphone. In other examples, the one or more audio inputs 210 may be a 3.5 millimeter audio jack. The 3.5 millimeter audio jack may be configured to connect a microphone to the sound enhancement device 204.

To setup the audio parameters of the sound enhancement device 204, the user may run an application 214 on his or her mobile device 202. In order to set the audio parameters of the sound enhancement device 204, the application 214 may provide a user with various input options or setup prompts. Further, the application 214 may also be used by the user to toggle the operation mode of the sound enhancement device 204. When the user sets parameters or a toggle through the application 214, the mobile device may communicate parameters to the sound enhancement device 204 by way of the USB mass storage mode of the wired interface 206. The sound enhancement device 204 may store the parameters in a memory of the sound enhancement device 204.

In some examples, the application 214 may walk a user through various configuration options and let the user select various parameters for each operation mode. In other examples, the user may be able select various equalization curves. The equalization curves may be chosen for each input (ambient audio via microphones and the wired input from the mobile device) independently, or the equalization curves may be set in common for the inputs. These equalization curves may be applied to the audio output created by the sound enhancement device 204.

The application 214 may allow the user to set frequency response equalization curves for both the mobile device and the ambient audio. The frequency response equalization curves may set directly by a user, such as dragging or setting an equalization level for each (or a subset) of given frequencies. In another example, the frequency response equalization curves may set indirectly by a user choosing a type of operation for each input. For example, a user may be given a choice of various operation, such as "bass enhancing", "dialog enhancing", "rock music", "noise reduction", etc. for the various inputs. Additionally, the user may also specify a listening profile by which the sound enhancement device 204 may be configured. A non-exclusive list of profiles include "music", "movies", and "conversations". When the user selects the operations for a given input, the mobile device may communicate the parameters to the sound enhancement device 204. Additionally, the user may provide other specification, such as dynamic range compression and/or multiband compression. These parameters may be stored to the memory of the mobile device.

In yet another example, the application 214 may be configured to automatically configure the operation parameters based on a user input. The application may cause a variety of sounds to be played to a user by way of the output 208 of the sound enhancement device 204. The output 208 may take the form of an audio output jack, for example, a 3.5 millimeter audio jack. The user may use his or her discretion to choose which sound better. Based on the user's selection, a sound profile may be created for the respective user and the respective inputs. The methods of setting parameters for a user's listening experience should not be limited to those presented here. There are many other ways to set desired listening conditions for a user beyond those described with the application 214 herein.

Figure 3:
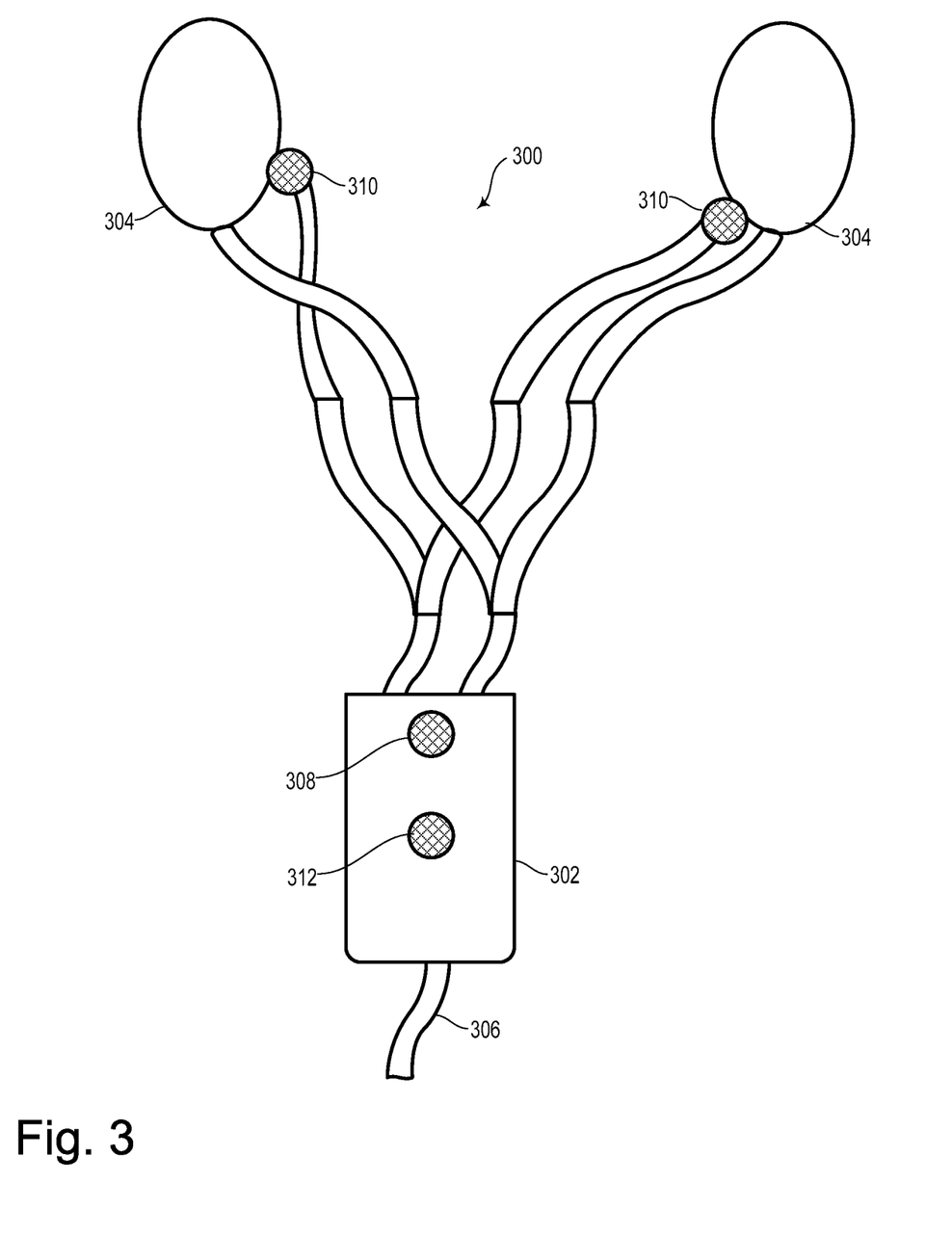
FIG. 3 illustrates a wearable configuration, according to an example implementation.

FIG. 3 illustrates a wearable configuration 300, according to an example implementation. The device 300 includes two earpieces 304 configured to provide audio to a wearer's ears. The earpieces 304 may take many forms, such as ear buds, headphones, bone conduction devices, etc. The earpieces 304 may be coupled by way of a wire (or wirelessly via wireless connection) to a sound enhancement device 302. The sound enhancement device may be similar to (or the same as) the sound enhancement devices described with respect to FIGS. 1A, 1B, and 2.

The sound enhancement device 302 may contain, for example, one or more device-mounted microphones 308, one more external microphones 310, a switch 312, a battery, one or more sensors, a processor, at least one communications interface, and onboard memory, among other possibilities.

The sound enhancement device 302 may, in turn, be coupled to an audio device by way of the wire 306. The wire 306 extends from one side of the sound enhancement device 302, which may be used to connect the device 302 to another device, such as a portable digital audio player, a smartphone, among other possibilities. Additionally or alternatively, the device 302 may communicate with other devices wirelessly, via a communications interface located in, for example, the housing. In this case, the wire 306 may be a removable cord, such as a charging cable.

The microphones 308 included in the housing (and/or microphones 310) may be omnidirectional microphones or, in some examples, directional microphones. Further, an array of microphones could be implemented. In the illustrated implementation, the device 302 includes two microphones 308 on the sound enhancement device 302 and two microphones 310 that are external to the sound enhancement device 302. In some example, a processor of the device 302 may be able to beam steer toward an audio source. The processor may also use time-delay information caused by the spatial separation of the microphones in order to determine different audio sources.

The microphones 308 (and/or microphones 310) may also detect sounds in the wearer's environment, such as the ambient speech of others in the vicinity of the wearer. Additional microphone configurations are also possible, including more or fewer microphones, or different microphone locations, such as arm extending from a portion of the housing, or a microphone located inline on one or both of the cords. In some further examples, the sound enhancement device 302 may only include either the microphones 308 or microphones 310. In some examples, the cable connecting the earpieces 304 to the sound enhancement device 302 may also communicate the signals from the microphones located near the earpieces 304. In some examples, the microphones 308 are configured to capture mono audio (i.e., single channel) while in other examples, the microphones 308 are configured to capture stereo audio (i.e., multiple channel). Additionally, in some examples, the sound enhancement device 302 may include two different audio inputs, one for a mono microphone and one for a stereo microphone (or two mono microphones). Other possibilities for providing information indicative of a local acoustic environment are contemplated herein.

Additionally, the sound enhancement device 302 may include a switch 312. In some examples, the switch 312 may be a physical switch on the sound enhancement device 302. However, in other examples, the switch 312 may be a software-controlled switch. The software-controlled switched may be toggled by a mobile application running on a mobile device coupled to the sound enhancement device. In other examples, the software-controlled switch may be controlled by a processor of the sound enhancement device 302. The switch 312 may toggle operation modes of the sound enhancement device 302. For example, the switch 312 may toggle between an assisted listening mode, a mobile device listening mode, a hybrid mode, and possibly other modes, for example.

Figure 4:
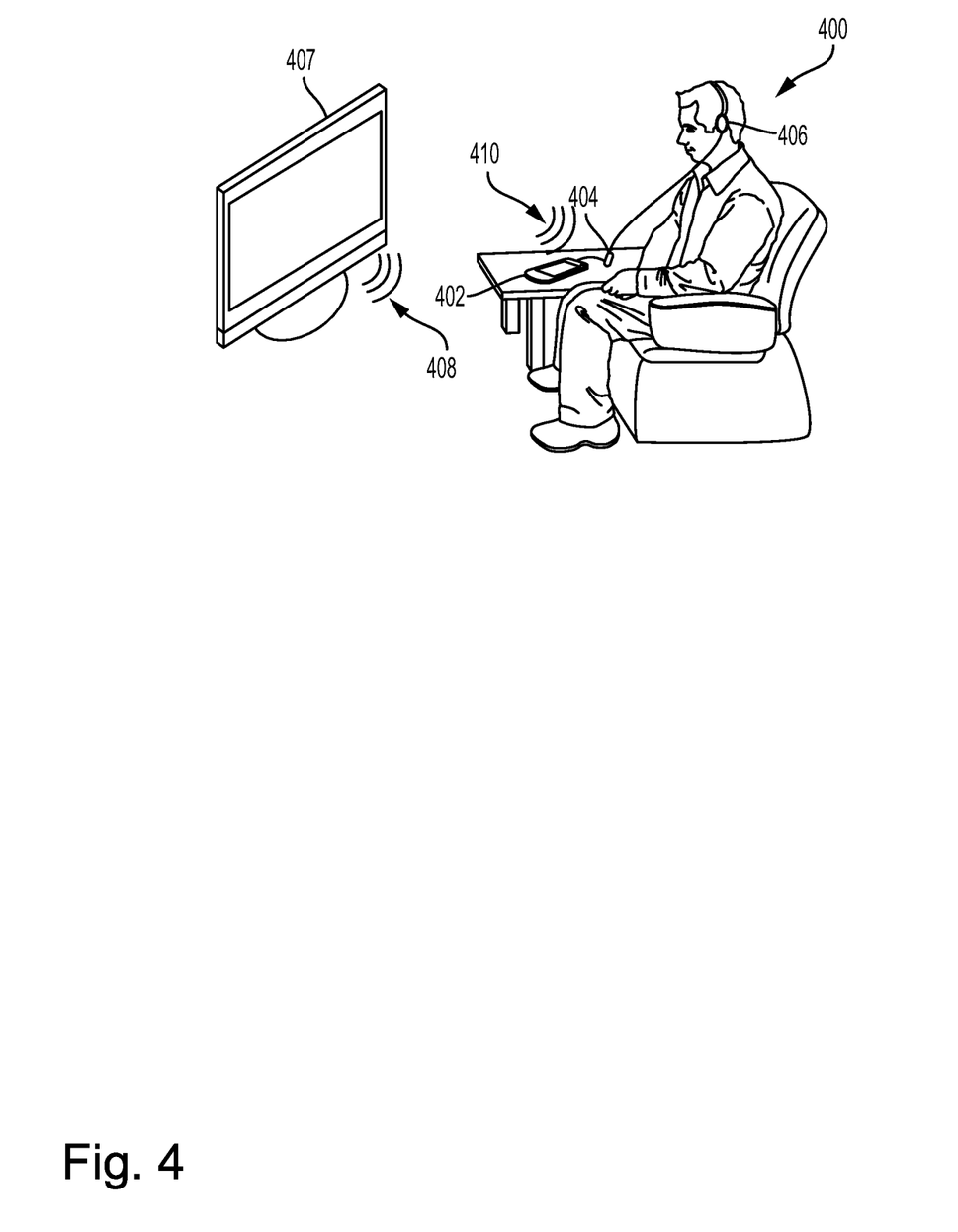
FIG. 4 illustrates a schematic diagram of a sound enhancement device, according to an example implementation.

FIG. 4 depicts a user 400 and a device 402 (e.g., a cell phone) in an environment. The device 402 may be coupled to a sound enhancement device 404 that, in turn, is coupled to headphones 406. There may be a variety of sound sources present in the environment, including sounds 408 emitted from by a television 407. Microphones of the sound enhancement device 404 may be able to receive ambient audio 410. Additionally, the device 402 may also generate audio signals itself, e.g., as an audio player and/or an audio stream received from some other source (e.g., a laptop computer, a remote server, the internet, a home media server) via a wired or wireless communications link.

These audio signals, which are accessible to the device 402 (e.g., via a microphone, or due to being generated by a processor of the device 402), may be a desired source of audio for the user 400. For example, the user 400 may select hearing audio provided by the device 402 and/or ambient audio 410. In some examples, the user 400 may wish to hear both audio provided by the device 402 and ambient audio 410. In various examples, the ambient audio 410 may be audio from another person's speech, audio from a television, audio from a radio, etc. For example, a user may want to listen to music from his or her device 402, but also be able to hear the environment (e.g., ambient audio 410) of his or her surroundings. In another example, the user may want to listen to music from his or her device 402, but also be able to toggle to listening to only the environment (e.g., ambient audio 410) of his or her surroundings.

Figure 5:
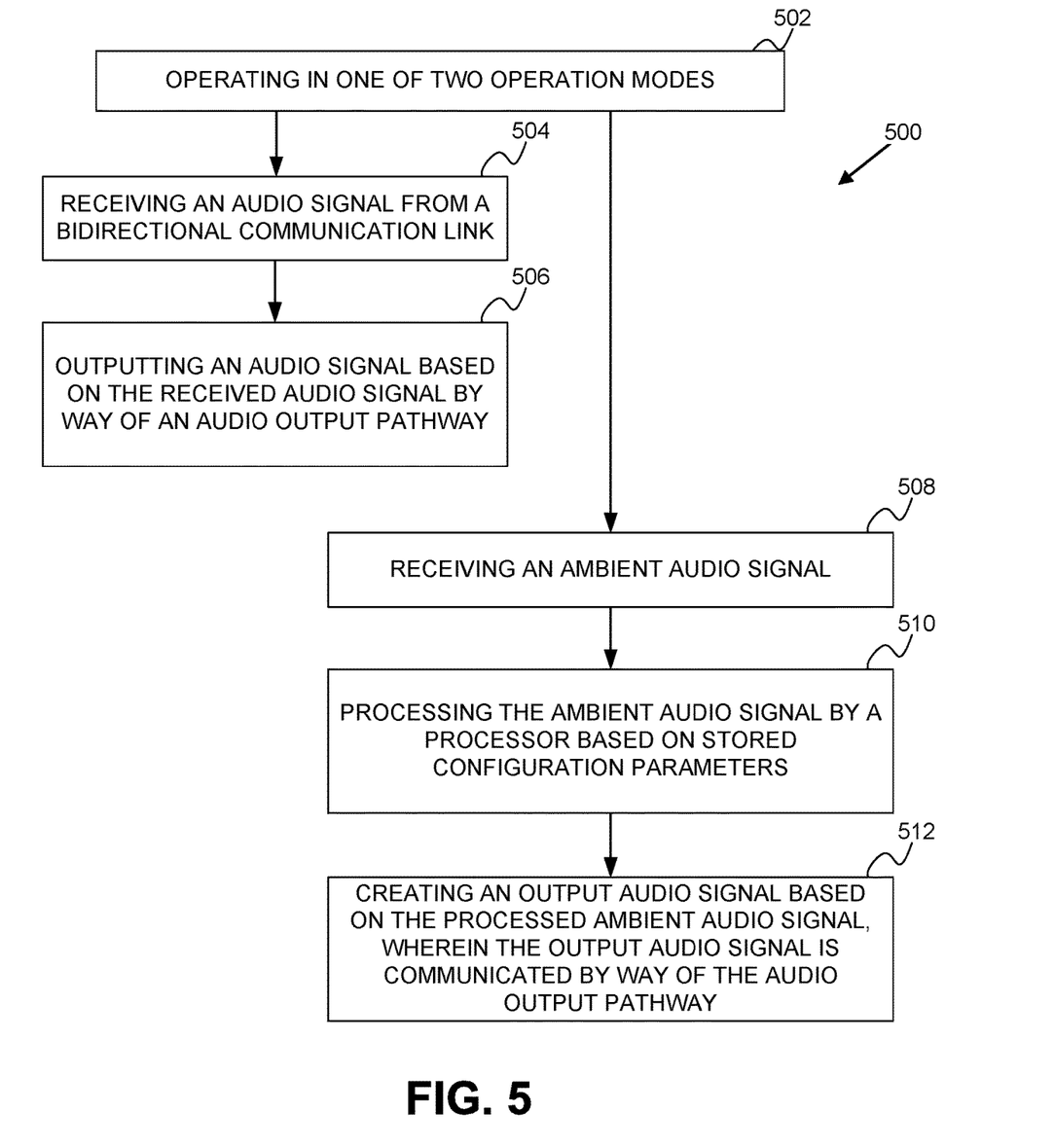
FIG. 5 illustrates a method of operating a sound enhancement device.

FIG. 5 illustrates a method 500 of operating a sound enhancement device. At block 502, the method 500 includes selectively operating in one of two operation modes. In some examples, the modes are not mutually exclusive. Therefore, the sound enhancement device may be used in both modes simultaneously. Block 502 may include a processor of the sound enhancement device determining to operate the device in the first mode, in the second mode, or in both modes simultaneously. The processor may determine the operating mode based on a user choosing an operation mode based on a switch, a user choosing an operation mode based on a selection in software, and/or the processor determining an operating mode on its own. In some examples, the processor may determine the operating mode based on received audio signals.

In some examples, block 502 may also include establishing the bidirectional communication link. The bidirectional communication link may be a USB connection. The USB connection may include a power interface, an audio-class device interface (the audio-class device interface may include both audio input and audio output), and establishing a mass-storage-class device interface. The mass-storage-class device interface may be used for a mobile device to store desired audio parameters to the sound enhancement device. Therefore, the method may also include the sound enhancement device receiving a set of configuration parameters by way of the bidirectional communication link and storing the configuration parameters in a memory of the sound enhancement device.

In the first mode, the method includes blocks 504 and 506. At block 504, the method 500 includes receiving an audio signal from a bidirectional communication link. The bidirectional communication link may be a USB link. The audio may be provided over the USB in either an analog or a digital format. In some examples, when the audio is provided in an analog format, the method may also include digitizing the analog audio for processing. The processing may include adjusting the audio based on a set of audio parameters provided by a user via an application. Thus, the sound enhancement device may adjust the audio that is played back from a user's mobile device based on the audio parameters. Additionally, in some instances when the sound enhancement device is operating in both modes at once, the processing may include combining the audio signal with an audio signal based on the ambient audio.

At block 506, the method 500 includes outputting an audio signal based on the received audio signal by way of an audio output pathway. The method may include converting processed audio back to an analog signal and outputting the analog signal to a user by way of an audio port. The audio port may be coupled to headphones so the user can hear a representation of the audio provided at block 504.

In the second mode, the method 500 includes blocks 508, 510, and 512. At block 508, the method 500 includes receiving an ambient audio signal. The ambient audio signal may be received by one or more microphones of the sound enhancement device. The sound enhancement device may responsively convert the received analog audio signal into a digital audio signal. In some examples, the microphone(s) may be configured to receive audio in a direction specified by the user of the system. In other examples, the microphones may be able to automatically determine a desired direction from which to receive audio. In yet other examples, the microphone(s) may be configured to receive audio from all directions. Additionally, in some examples the method may include receiving one audio channel (mono), two audio channels (stereo), or more channels of audio from the microphone(s).

At block 510, the method 500 includes processing the ambient audio signal by a processor based on stored configuration parameters. The processor may use audio configuration parameters to adjust the digitized version of the audio signal. For example, a user may have specified that they would like audio corresponding to voices to be enhanced. Therefore, the processor may operate to enhance audio corresponding to audio frequencies within the human voice band. There are numerous other audio processing parameters that may be used as well (and specified by a user of the sound enhancement system). As previously stated, in some instances when the sound enhancement device is operating in both modes at once, the processing may include combining the audio signal with an audio signal based on the ambient audio.

At block 512, the method 500 includes creating an output audio signal based on the processed ambient audio signal, wherein the output audio signal is communicated by way of the audio output pathway. The method may include converting a processed audio back to an analog signal and outputting the analog signal to a user by way of an audio port. The audio port may be coupled to headphones so the user can hear a representation of the audio received at block 508.

The particular arrangements illustrated in the Figures should not be viewed as limiting. It should be understood that other embodiments may include more or less of each element illustrated in a given Figure. Further, some of the illustrated elements may be combined or omitted. Yet further, an illustrative embodiment may include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A wearable sound enhancement system comprising:
   a first bidirectional communication link configured to:
      receive an audio signal from a mobile device;
      transmit an audio signal to the mobile device; and
      receive configuration parameters from the mobile device; and
   a wearable housing comprising:
      a memory configured to store the configuration parameters;
      an audio input configured to receive ambient audio and output an ambient audio signal;
      an audio processor; and
      an audio output pathway,
      wherein the processor of the sound enhancement system is configured to operate in one of two operation modes, and
   wherein:
      in a first mode, the sound enhancement system is configured to receive an audio signal by the bidirectional communication link and output an audio signal based on the received audio signal from the bidirectional communication link by way of the audio output pathway; and
      in a second mode, the sound enhancement system is configured to:
         perform beam steering on the audio input to steer a beam toward a desired audio source, wherein the audio input comprises at least one microphone; and
         process the ambient audio signal by the audio processor based on stored configuration parameters and create an output audio signal, wherein the output audio signal is communicated by way of the audio output pathway.

2. The sound enhancement system of claim 1, wherein the first bidirectional communication link comprises a Universal Serial Bus (USB) link.

3. The sound enhancement system of claim 2, wherein the USB link comprises an audio-class device and a mass-storage-class device.

4. The sound enhancement system of claim 3, wherein the audio-class device comprises an audio input and an audio output.

5. The sound enhancement system of claim 3, wherein the mass-storage-class device is configured to receive the configuration parameters.

6. The sound enhancement system of claim 1, wherein the audio input comprises a stereo pair of microphones.

7. The sound enhancement system of claim 1, wherein the audio input comprises an input configured to be coupled to at least one microphone.

8. The sound enhancement system of claim 1, further comprising a battery and a switch configured to select the first or second operation mode.

9. The sound enhancement system of claim 1, wherein the processor is further configured to operate in both the first and second mode simultaneously.

10. The sound enhancement system of claim 1, further comprising a digital to analog converter configured to convert a digital audio signal communicated by the first bidirectional communication link to the audio signal to be output.

11. A method of operating a wearable audio component, comprising:
operating in one of two operation modes, wherein:
in a first mode, the method comprises:
receiving an audio signal from a mobile device by a bidirectional communication link; and
outputting an audio signal based on the received audio signal by way of an audio output pathway; and
in a second mode, the method comprises:
receiving an ambient audio signal, wherein receiving an ambient audio signal is performing by an input configured to be coupled to at least one microphone;
performing beam steering on the input to steer a beam toward a desired audio source;
processing the ambient audio signal by a processor based on stored configuration parameters; and
creating an output audio signal based on the processed ambient audio signal, wherein the output audio signal is communicated by way of the audio output pathway, and wherein the at least one microphone, the processor, and the audio output pathway are disposed within a wearable housing.

12. The method of claim 11, further comprising establishing the bidirectional communication link, wherein the bidirectional communication link comprises establishing an audio-class device interface and establishing a mass-storage-class device interface.

13. The method of claim 11, further comprising:
receiving a set of configuration parameters by way of the bidirectional communication link; and
storing the configuration parameters in a memory.

14. The method of claim 11, wherein creating an output audio signal based on the processed ambient audio signal further comprises combining the ambient audio signal with the audio signal from a bidirectional communication link.

15. The method of claim 11, wherein receiving an ambient audio signal comprises receiving a stereo audio signal comprising audio signals from at least two microphones.

16. The method of claim 11, wherein the method comprises operating in the first and second mode simultaneously.

17. The method of claim 11, further comprising converting a digital audio signal received from the bidirectional communication link to an analog audio signal based for output by way of an audio output pathway.

18. A non-transitory computer-readable medium configured to store instructions, that when executed by a wearable computing system comprising one or more processors, causes the wearable computing system to perform operations comprising:
operating in one of two operation modes, wherein:
in a first mode, the operations comprise:
establishing a bidirectional communication link, wherein the bidirectional communication link comprises establishing an audio-class device interface and establishing a mass-storage-class device interface;
receiving an audio signal from the audio-class device interface; and
outputting an audio signal based on the received audio signal by way of an audio output pathway; and
in a second mode, the operations comprise:
receiving an ambient audio signal by way of one of (i) a stereo pair of microphones and (ii) an input configured to be coupled to at least one microphone;
performing beam steering on one of (i) a stereo pair of microphones and (ii) an input configured to be coupled to at least one microphone to steer a beam toward a desired audio source;
processing the ambient audio signal by a processor based on stored configuration parameters; and
creating an output audio signal based on the processed ambient audio signal,
wherein the output audio signal is communicated by way of the audio output pathway,
wherein the wearable computing system may operate in the first mode and the second mode simultaneously, and
wherein at least one microphone, the processor, and the audio output pathway are disposed within a wearable housing.

* * * * *